COMPUTER REELS

Filed July 5, 1966

INVENTOR
FRANCIS E. GRUBER

BY Robert M. Dunning
ATTORNEY

United States Patent Office 3,346,211
Patented Oct. 10, 1967

3,346,211
COMPUTER REELS
Francis E. Gruber, St. Paul, Minn., assignor to Northwest Plastics, Inc., Dakota County, Minn., a corporation of Minnesota
Filed July 5, 1966, Ser. No. 562,614
8 Claims. (Cl. 242—71.8)

ABSTRACT OF THE DISCLOSURE

This invention disclosed a computer reel or the like made in three parts: a hub and a pair of side flanges cooperable with, and supported by, the hub. The hub is preferably of I-beam cross-section including an inner flange, a concentric outer flange, and a web connecting the hub flanges. The web is provided with a series of angularly spaced apertures. Angularly spaced angular fingers are provided on the outer hub flange to extend inwardly between the hub flanges, these fingers extending alternately from opposite ends of the outer flange. Each finger extends from one end of the outer hub flange inwardly and through a corresponding aperture in the web to terminate substantially flush with the opposite end of the outer hub flange. Each side flange on each end of the hub is secured to the ends of the fingers attached to the opposite end of the outer hub flange, compensating for any small dimensional changes of the hub itself.

This invention relates to an improvement in computer reels and deals particularly with a reel or spool of the type which may be used for the storage of magnetic tape and the like.

Many different forms of reels have been produced for the storage of magnetic tape. Some of these reels have been made completely of metal, others made completely of plastic, and others have been produced having a metal core and having flanges formed of a plastic material in order to reduce the weight. One of the difficulties experienced with plastic reels lies in the fact that when the tape is wound upon the reel, there is a tendency for the hub of the reel to compress to some slight extent. This causes a distortion of the reel flanges, and the flanges tend to flex out of their proper planes.

It has been found that if the flanges are resiliently connected to the hub, the previous difficulties may be eliminated. Rather than to connect the flanges directly to the reel hub, resilient fingers are provided on the core or hub which act to support the flanges. As a result, any slight compression of the hub during use will be transmitted to the flanges only through the resilient fingers, so that distortion of the hub will not cause a corresponding distortion of the flanges.

A feature of the present invention resides in the provision of a reel which may be produced at relatively low cost, preferably with the core made of a plastic material having high compressive strength and great rigidity. The core is similar to an I-beam in cross-section, including outer and inner concentric cylindrical flanges connected by a connecting web. The central web of the beam is provided with angularly spaced apertures. Angular fingers are supported by the outer flange of the hub, these fingers extending inwardly therefrom toward the inner flange of the hub, and then transversely through the openings in the web, thus providing generally L-shaped fingers extending through the web from one side to the other, and terminating substantially flush with the axial ends of the outer flange. Alternate of these fingers extend from opposite side edges of the outer flange. The side flanges of the reel, which are generally flat and ring-shaped in form, are cemented or similarly adhered to the free ends of these fingers. As a result, the ring-shaped side flanges are supported by the resilient fingers, rather than by direct attachment to the flanges of the hub or core. The resilient fingers may compensate for any small variations in the dimensions of the hub itself.

A further feature of the present invention resides in the provision of a reel of the type described in which each of the side flanges is provided with a series of sockets designed to accommodate the end of the resilient supporting fingers. Alternatively, the side flanges may be provided with ribs or ridges between which the ends of the fingers may extend to increase the area of adhesive attachment between the fingers and the side flanges.

These and other objects and novel features of the present invention will be more clearly and fully set forth in the following specification and claims.

In the drawings forming a part of the specification:

Figures 1, 2, 3, 4, 5:
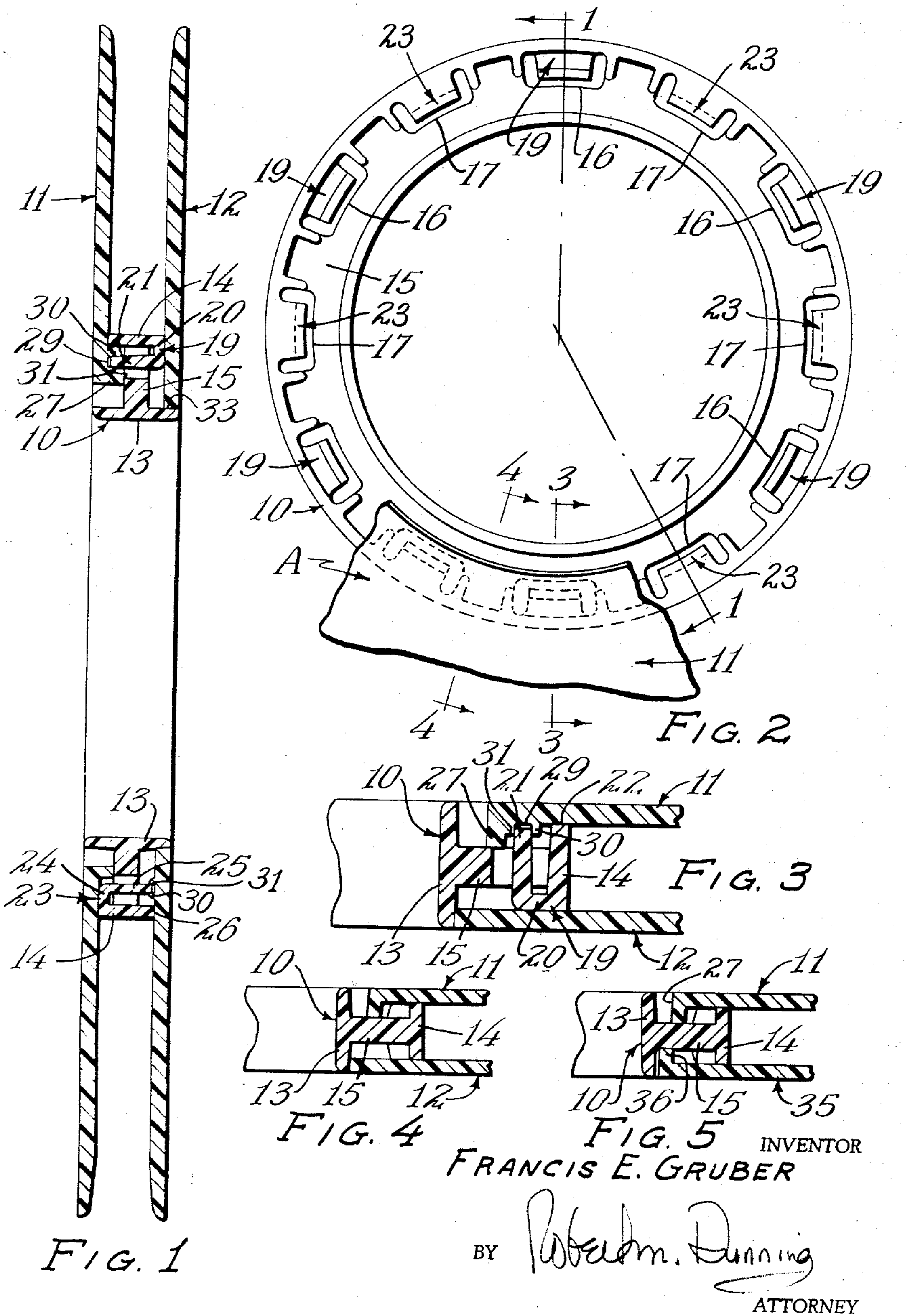
FIGURE 1 is a sectional view through the computer reel showing the general relationship of parts therein, the position of the section being indicated by the line 1—1 of FIGURE 2.
FIGURE 2 is a side elevational view of the hub or core with a portion of one of the side flanges attached thereto.
FIGURE 3 is a sectional view through a portion of the hub illustrated in FIGURE 2, the position of the section being indicated by the line 3—3 of FIGURE 2.
FIGURE 4 is a sectional view through a portion of the structure shown in FIGURE 2, the position of the section being indicated by the line 4—4 of FIGURE 2.
FIGURE 5 is a view similar to FIGURE 4 but showing a slightly modified form of construction.

The computer reel is indicated in general by the letter A. The reel includes a hub which is indicated in general by the numeral 10, and a pair of side flanges which are indicated in general by the numerals 11 and 12.

The reel hub 10 is preferably made of a thermoplastic material having a high compressive strength and great rigidity. A preferred material is glass-filled styrene-acrylonitrile copolymer. The hub 10 is similar to an I-beam in cross-section, includes an inner flange 13 which is designed for support upon the mounting spindle of a device, and an outer flange 14 which is concentric with the inner flange 13 and encircles the same. Preferably, the outer flange 14 is of reduced axial length relative to the inner flange 13. The hub flanges 13 and 14 are connected by a web 15 which is located intermediate the edges of the flanges 13 and 14.

As is indicated in FIGURE 2 of the drawing, the web 15 is interrupted by a series of apertures 16, and an intermediate alternate series of apertures 17. As is indicated in the upper portion of FIGURES 1 and in 3 of the drawings, a series of L-shaped fingers 19 are provided on the outer flange 14 of the hub 10, these fingers 19 extending through the apertures 16. Each of the fingers 19 include an inwardly extending arm portion 20, which extends toward the flange 13 from an axial end edge of the outer flange 14. Each arm portion 20 supports a transverse end portion 21, which extends through the aperture 16 and terminates flush with an end edge 22 of the outer flange 14. As indicated in the lower portion of FIGURE 1 of the drawings, the outer hub flange 14 also includes a series of flangers 23, which include an arm portion 24 extending inwardly from the flange 14 toward the inner flange 13 at the edge 22 thereof opposite that from which the fingers 19 extend. The arm portions 24 support laterally extending arm portions 25 which extend through the apertures 17 in the hub web and terminate substantially flush with the edge 26 of the outer flange 14.

As is indicated in FIGURE 1 of the drawings, the side flange 11 includes a substantially laterally projecting rib 27 at its inner circumference, the rib 27 engaging against the surface of the web 15. The inner surface of the flange 11, as well as the inner surface of the flange 12, is provided with a series of angularly spaced pockets 29, which form sockets into which the ends of the arm extremities 21 or 25 may extend and be cemented, welded or otherwise attached. These sockets may extend about the entire periphery of the arm extremities 21, or may comprise a pair of spaced ribs 30 and 31, between which the ends of the resilient fingers 19 may extend.

As is indicated in the drawings, the flange 12 has its inner circumference 33 encircling the outer surface of the inner flange 13. However, the attachment of the flange 12 to the hub 10 is through the connection between the ends of the fingers 23 to the pockets 29 or in the space between the ribs 30 and 31. Because of this, the outer hub flange 14 may contract independently of the side flanges 11 and 12.

FIGURE 5 of the drawing shows a slightly modified form of construction in which the hub 10 and the flange 11 are identical to those previously described, and accordingly have been given the same identifying numerals. The major feature of the difference in the two constructions lies in the substitution of a flange 35 for the flange 12. The flange difference lies in the fact that the flange 35 does not fit upon the inner concentric flange 13 of the hub 10 as does the flange 12. The flange 35 is provided with angularly spaced inwardly directed rib means 36 which engages against the surface of the web 15 in the same manner the rib means 27 of the flange 11 engages this web. In this case, the flange 35, like the flange 11, is secured to the hub 10 only by the adherence of the ends of the fingers forming a part of the hub.

In accordance with the patent statutes, I have described the principles of construction and operation of my improvement in computer reels, and while I have endeavored to set forth the best embodiment thereof, I desire to have it understood that changes may be made within the scope of the following claims without departing from the spirit of my invention.

I claim:

1. A computer reel including:

a hub in the shape of an I-beam in cross-section with the inner and outer flanges of the I-beam describing inner and outer cylinders connected by a web, said web having a series of angularly spaced apertures therethrough, angular fingers connected alternately to opposite end edges of said outer flange and extending through said apertures to terminate substantially flush with opposite end edges of said outer flange, and a pair of side flanges of ring-shaped form in contacting relation with opposite ends of said outer flange and secured to the ends of said fingers.

2. The structure of claim 1 and in which said fingers are generally L-shaped in form.

3. The structure of claim 1 and in which said fingers include an inwardly extending portion connected to said outer flange and extending toward said inner flange, and a transverse end portion extending substantially parallel to the hub axis.

4. The structure of claim 1 and including angularly projecting laterally extending ribs on the inner periphery of at least one said side flange in contact with said web of said hub.

5. The structure of claim 4 and in which the other of said side flanges is supported on the inner flange of the hub.

6. The structure of claim 4 and in which both said side flanges include said angularly projecting laterally extending ribs.

7. The structure of claim 1 and including sockets on the inner surfaces of said side flanges into which the ends of said fingers extend.

8. The structure of claim 1 and in which said hub is formed of a thermoplastic material having high compressive strength and great rigidity.

References Cited

UNITED STATES PATENTS

| | | | |
|---|---|---|---|
| 3,088,689 | 5/1963 | Perlini | 242—71.8 |
| 3,229,928 | 1/1966 | Burgess et al. | 242—71.8 |

FRANK J. COHEN, *Primary Examiner.*

N. L. MINTZ, *Assistant Examiner.*